United States Patent
Higashi et al.

(10) Patent No.: US 9,174,854 B2
(45) Date of Patent: Nov. 3, 2015

(54) BRONZE-TYPE TITANIUM OXIDE COMPOUND CONTAINING POTASSIUM, METHOD OF MANUFACTURING THE SAME, AND LITHIUM-ION SECONDARY BATTERY USING THE SAME

(71) Applicant: KUBOTA Corporation, Osaka-shi, Osaka (JP)

(72) Inventors: Kenji Higashi, Amagasaki (JP); Hiroshi Okumura, Amagasaki (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/822,390

(22) PCT Filed: Sep. 28, 2012

(86) PCT No.: PCT/JP2012/075028
§ 371 (c)(1),
(2) Date: Mar. 12, 2013

(87) PCT Pub. No.: WO2013/099380
PCT Pub. Date: Jul. 4, 2013

(65) Prior Publication Data
US 2014/0127509 A1 May 8, 2014

(30) Foreign Application Priority Data

Dec. 28, 2011 (JP) .................... 2011-289133

(51) Int. Cl.
*B01D 1/00* (2006.01)
*C01D 1/02* (2006.01)
(Continued)

(52) U.S. Cl.
CPC .............. *C01G 23/04* (2013.01); *C01G 23/001* (2013.01); *C01G 23/005* (2013.01);
(Continued)

(58) Field of Classification Search
CPC ...... C01G 23/001; C01G 23/005; C01G 23/04
USPC .................... 423/70, 608, 609, 610, 641
See application file for complete search history.

(56) References Cited

U.S. PATENT DOCUMENTS

2007/0292760 A1* 12/2007 Patoux et al. ............... 429/223
2008/0249222 A1* 10/2008 Itoi .............................. 524/413
(Continued)

FOREIGN PATENT DOCUMENTS

| EP | 0 684 215 A1 | 11/1995 |
|----|--------------|---------|
| JP | 04-073218 A | 3/1992 |

(Continued)

OTHER PUBLICATIONS

Marchand et al., TiO2(B) A new form of titanium dioxide and the potassium octatitanate K2Ti8O17, Mat. Res. Bull., vol. 15, pp. 1129-1133, 1980.*
(Continued)

*Primary Examiner* — Holly Le
(74) *Attorney, Agent, or Firm* — Keating & Bennett, LLP

(57) ABSTRACT

In a titanium oxide compound according to the present invention, the titanium oxide compound is obtained by eluating potassium of potassium tetratitanate expressed by a general formula $K_2Ti_4O_9$ and performing thermal processing, and, in an X-ray diffraction spectrum of the potassium tetratitanate obtained by using a Cu—Kα ray source, between a peak intensity Ia of a (200) plane, a peak intensity Ic of a (004) plane and a peak intensity Ib of a (31-3) plane, a relationship of Ia>Ib>Ic is satisfied.

7 Claims, 11 Drawing Sheets

(51) Int. Cl.
*C01G 23/04* (2006.01)
*C01G 23/08* (2006.01)
*C01G 23/00* (2006.01)
*H01M 4/48* (2010.01)
*H01M 4/485* (2010.01)
*C01G 23/047* (2006.01)

(52) U.S. Cl.
CPC .............. *C01G 23/047* (2013.01); *H01M 4/48* (2013.01); *H01M 4/485* (2013.01); *C01P 2002/72* (2013.01); *C01P 2002/74* (2013.01); *C01P 2006/12* (2013.01); *Y02E 60/122* (2013.01); *Y10T 428/2982* (2015.01)

(56) References Cited

U.S. PATENT DOCUMENTS

| | | | |
|---|---|---|---|
| 2011/0073804 A1 | 3/2011 | Sotokawa et al. | |
| 2012/0183836 A1* | 7/2012 | Harada et al. | 429/149 |

FOREIGN PATENT DOCUMENTS

| | | |
|---|---|---|
| JP | 2000-313620 A | 11/2000 |
| JP | 2001-253712 A | 9/2001 |
| JP | 2008-117625 A | 5/2008 |
| JP | 2011-241100 A | 12/2011 |
| JP | 2012-012248 A | 1/2012 |
| WO | 2009/028530 A1 | 3/2009 |
| WO | 2011/013254 A1 | 2/2011 |

OTHER PUBLICATIONS

Banfield et al., The identification of naturally occurring TiO2(B) by structure determination using high-resolution electron microscopy, image stimulation, and distance-least-squares refinement, American Mineralogist, vol. 76, pp. 343-353, 1991.*
Machine Translation JP 2000-313620 (2000).*
Official Communication issued in International Patent Application No. PCT/JP2012/075028, mailed on Nov. 27, 2012.
Ohta et al., "Change Processes from Potassium Tetratitanate Fibers to Potassium Hexatitanate Fibers and through Hydrated Titania Fibers to Anatase Fibers", Journal of the Ceramic Association Japan, vol. 88, No. 1, The Ceramic Society of Japan, p. 1-8, cited in the Office Action of 2011-289133 dated Feb. 5, 2013.
Zukalová et al., "Electrochemical and Gas-Phase Photocatalytic Performance of Nanostructured TIO2(B) Prepared by Novel Synthetic Route," Progress in Solid State Chemistry, 2005, pp. 253.261.
Official Communication issued in corresponding European Patent Application No. 12 829 138.2, mailed on Dec. 19, 2014.

* cited by examiner

FIG.4

| STRUCTURE | LAYER STRUCTURE | LAYER STRUCTURE |
|---|---|---|
| CHEMICAL NAME | POTASSIUM DITITANATE | POTASSIUM TETRATITANATE |
| COMPOSITION FORMULA | $K_2Ti_2O_5$ | $K_2Ti_4O_9$ |
| CRYSTAL STRUCTURE | 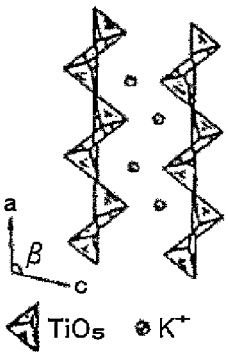 $TiO_5$  $K^+$ | 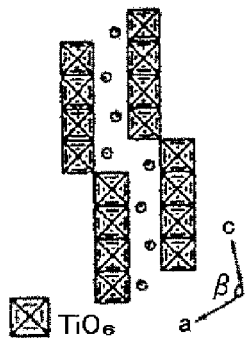 $TiO_6$ |
| CRYSTAL SYSTEM | MONOCLINIC SYSTEM | MONOCLINIC SYSTEM |
| SPACE GROUP | C2/m | C2/m |
| LATTICE CONSTANT a(nm) | 1.137 | 1.825 |
| LATTICE CONSTANT b(nm) | 0.38 | 0.379 |
| LATTICE CONSTANT c(nm) | 0.662 | 1.201 |
| LATTICE CONSTANT $\beta$(°) | 100.1 | 106.4 |
| NUMBER OF MOLECULES IN UNIT LATTICE | 2 | 4 |

FIG.8

|  |  | Ia<br>d=8.76<br>(200) | Ic<br>d=2.88<br>(004) | Ib<br>d=2.66<br>(31$\bar{3}$) | Ia/Ic |
|---|---|---|---|---|---|
|  |  | PEAK INTENSITY RATIO |  |  |  |
| BURNING METHOD 4T | D1 | 100 | 30 | 44 | 3.3 |
|  | D2 | 100 | 41 | 45 | 2.4 |
|  | D3 | 100 | 38 | 44 | 2.6 |
| MELTING METHOD 4T | D4 | 100 | 17 | 26 | 5.9 |
| DIRECT SYNTHESIS METHOD 4T | D5 | 100 | 59 | 46 | 1.7 |

FIG.11

| | INITIAL DISCHARGE CAPCACITY (0.2C) (mAh/g) |
|---|---|
| EXAMPLE 1 | 235 |
| EXAMPLE 2 | 236 |
| EXAMPLE 3 | 228 |
| EXAMPLE 4 | 226 |
| EXAMPLE 5 | 228 |
| EXAMPLE 6 | 230 |
| EXAMPLE 7 | 220 |
| COMPARATIVE EXAMPLE 1 | 208 |

BRONZE-TYPE TITANIUM OXIDE COMPOUND CONTAINING POTASSIUM, METHOD OF MANUFACTURING THE SAME, AND LITHIUM-ION SECONDARY BATTERY USING THE SAME

TECHNICAL FIELD

The present invention relates to a titanium oxide compound and a method of manufacturing it; the invention further relates to potassium tetratitanate used in the synthesis of a titanium oxide compound, a negative electrode that uses a titanium oxide compound as a negative-electrode active substance and a lithium-ion secondary battery that uses such a negative electrode. The invention also relates to potassium tetratitanate and a hydrated tetratitanate compound.

BACKGROUND ART

Although conventionally, a carbon-based raw material is generally used as the negative electrode of a lithium-ion secondary battery, in recent years, it has been often reported that such a lithium-ion secondary battery has produced abnormal heat and ignition (so-called thermal runaway). It is thought that the thermal runaway is produced partly because of a short-circuit within the battery. This is because, when a short-circuit occurs within the battery, an excessive inrush current flows toward the negative electrode, and thus heat is produced in the negative electrode and other members.

The internal short-circuit occurs probably because of an external impact or the breakage of a separator caused by a columnar metal lithium crystal (dendrite) precipitated on the surface of the negative electrode. The reason why the metal lithium crystal is easily precipitated in the lithium-ion secondary battery using the carbon-based raw material as the negative electrode is that the potential of the negative electrode is so low as to be 0.08 volt (vs. Li).

On the other hand, it is known that, as the negative electrode of the lithium-ion secondary battery, a spinel-type lithium titanate (S-LTO) is used, in addition to the carbon-based raw material. In the lithium-ion secondary battery using this negative electrode, since the potential of the negative electrode is so high as to be 1.55 volts (vs. Li), a metal lithium crystal is unlikely to be precipitated on the surface of the negative electrode, and thus it is possible to reduce the risk of the occurrence of an internal short-circuit; however, its negative electrode theoretical capacity is disadvantageously so low as to be about 175 mAh/g (in the carbon-based raw material, 372 mAh/g).

It is proposed that, as the negative electrode of the lithium-ion secondary battery, a bronze-type titanium oxide compound is used (for example, see patent document 1). In the lithium-ion secondary battery using this negative electrode, as in the case where the S-LTO is used, since the potential of the negative electrode is so high as to be about 1.5 volts (vs. Li), a metal lithium crystal is unlikely to be precipitated on the surface of the negative electrode, and thus it is possible to reduce the risk of the occurrence of an internal short-circuit; moreover, as compared with the case where the S-LTO is used, its negative electrode theoretical capacity can be increased up to 335 mAh/g.

RELATED ART DOCUMENT

Patent Document

Patent document 1: JP-A-2008-117625

DISCLOSURE OF THE INVENTION

Problems to be Solved by the Invention

However, when a titanium oxide compound obtained by a conventional manufacturing method is used as the negative electrode of a lithium-ion secondary battery, an actual value of the capacity of the negative electrode is lower than the theoretical value described above, and hence there is further room for improvement.

In view of the foregoing problem, an object of the present invention is to provide a titanium oxide compound in which safety is high as compared with the conventional method and which can be used as a negative electrode of high capacity and a method of manufacturing such a titanium oxide compound and a lithium-ion secondary battery using such a titanium oxide compound, by using a method of synthesizing an intermediate characterized by a crystal structure where $TiO_6$ octahedrons are chain-linked to form a layer structure through a precursor where $TiO_5$ trigonal bipyramidals are chain-linked to form a layer structure and then synthesizing, from this intermediate, a titanium oxide compound having a crystal structure where the $TiO_6$ octahedrons are chain-linked. Another object of the present invention is to provide potassium tetratitanate having such a structure that a large number of alkali metal ions are held and that the insertion and removal of them are enhanced and a hydrated tetratitanate compound obtained by using such as potassium tetratitanate.

Means for Solving the Problem

To achieve the above object, according to the present invention, there is provided a titanium oxide compound in which the titanium oxide compound is obtained by eluating potassium of potassium tetratitanate (4T) expressed by a general formula $K_2Ti_4O_9$ and performing thermal processing, and, in an X-ray diffraction spectrum of the potassium tetratitanate (4T) obtained by using a Cu—Kα ray source, between a peak intensity Ia of a (200) plane, a peak intensity Ic of a (004) plane and a peak intensity Ib of a (31-3) plane, a relationship of Ia>Ib>Ic is satisfied (first configuration).

Preferably, in the titanium oxide compound of the first configuration, in an X-ray diffraction spectrum of the potassium tetratitanate (4T) obtained by using the Cu—Kα ray source, between a peak intensity Ia of a (200) plane and a peak intensity Ic of a (004) plane, a relationship of 10.0>Ia/Ic>2.0 is satisfied (second configuration).

Preferably, in the titanium oxide compound of the first or second configuration, the potassium tetratitanate is obtained by eluating a part of potassium ions of potassium dititanate (2T) expressed by a general formula $K_2Ti_2O_5$ to change a composition thereof and thereafter performing thermal processing (third configuration).

Preferably, in the titanium oxide compound of any one of the first to third configurations, the concentration of the potassium is more than 0 but equal to or less than 2.0 mass percent (fourth configuration).

Preferably, in the titanium oxide compound of any one of the first to fourth configurations, a specific surface area measured with a BET method is equal to or more than 3 but equal to or less than 80 m²/g (fifth configuration). Preferably, in the titanium oxide compound of any one of the first to fifth configurations, the titanium oxide compound is a bronze-type titanium oxide or the titanium oxide compound is formed mainly of a bronze-type titanium oxide and contains a very small amount of an anatase-type titanium oxide or of a hydrated titanium oxide (sixth configuration).

According to the present invention, there is preferably provided a method of manufacturing a titanium oxide compound, the method including: a step of obtaining potassium tetratitanate from potassium dititanate; a step of obtaining a hydrated tetratitanate compound from the potassium tetratitanate; and a step of obtaining the titanium oxide compound from the hydrated tetratitanate compound (seventh configuration).

According to a first aspect of the present invention, there is provided a potassium tetratitanate that is used for synthesis of a titanium oxide compound. In the potassium tetratitanate, in an X-ray diffraction spectrum obtained by using a Cu—Kα ray source, between a peak intensity Ia of a (200) plane, a peak intensity Ic of a (004) plane and a peak intensity Ib of a (31-3) plane, a relationship of Ia>Ib>Ic is satisfied (eighth configuration).

Preferably, in the potassium tetratitanate of the seventh configuration, in the X-ray diffraction spectrum obtained by using the Cu—Kα ray source, between the peak intensity Ia of the (200) plane and the peak intensity Ic of the (004) plane, the relationship of 10.0>Ia/Ic>2.0 is satisfied (ninth configuration).

According to the present invention, there is provided a negative electrode in which the titanium oxide compound of any one of the first to sixth configurations or the titanium oxide compound obtained by the manufacturing method of the seventh configuration is used as a negative-electrode active substance (tenth configuration).

According to the present invention, there is provided a lithium-ion secondary battery including: the negative electrode of the tenth configuration (eleventh configuration).

According to a second aspect of the present invention, there is provided a potassium tetratitanate in which, in an X-ray diffraction spectrum obtained by using a Cu—Kα ray source, between a peak intensity Ia of a (200) plane, a peak intensity Ic of a (004) plane and a peak intensity Ib of a (31-3) plane, a relationship of Ia>Ib>Ic is satisfied (twelfth configuration).

Preferably, in the potassium tetratitanate of the twelfth configuration, in an X-ray diffraction spectrum obtained by using the Cu—Kα ray source, between a peak intensity Ia of a (200) plane and a peak intensity Ic of a (004) plane, a relationship of 10.0>Ia/Ic>2.0 is satisfied (thirteenth configuration). Preferably, in the potassium tetratitanate of the twelfth or thirteenth configuration, the potassium tetratitanate is obtained by eluating a part of potassium ions of potassium dititanate expressed by a general formula $K_2Ti_2O_5$ to change a composition thereof and thereafter performing thermal processing. According to the present invention, there is provided a hydrated tetratitanate compound that is obtained by subjecting the potassium tetratitanate of any one of the configurations described above to proton exchange processing.

Advantageous Effects of Invention

According to the present invention, it is possible to provide a titanium oxide compound in which safety is high and which can be used as a negative-electrode active substance of high capacity and a method of manufacturing such a titanium oxide compound and a lithium-ion secondary battery using such a titanium oxide compound.

BRIEF DESCRIPTION OF DRAWINGS

FIG. 4 A table showing the crystal structure of potassium titanates;

FIG. 8 A table showing the intensity ratio of the X-ray diffraction peaks of potassium tetratitanate;

FIG. 11 A table showing the initial discharge capacity in examples 1 to 7 and comparative example 1.

DESCRIPTION OF EMBODIMENTS

An embodiment of a titanium oxide compound and a method of manufacturing such a titanium oxide compound and a lithium-ion secondary battery using such a titanium oxide compound, in the present invention, will be described below. Examples of the titanium oxide compound include a hydrated titanium oxide, a bronze-type titanium oxide, an anatase-type titanium oxide and a rutile-type titanium oxide and mixtures of two or more of these compounds.

<The Method of Manufacturing the Titanium Oxide Compound>

(Outline)

The method of manufacturing the titanium oxide compound according to the present invention includes: a step of obtaining potassium tetratitanate ($K_2Ti_4O_9$) from potassium dititanate ($K_2Ti_2O_5$); a step of obtaining a hydrated tetratitanate compound ($H_2Ti_4O_9 \cdot nH_2O$) from the potassium tetratitanate; and a step of obtaining the titanium oxide compound from the hydrated tetratitanate compound.

As a step of obtaining the potassium dititanate described above, any of the following method and a step (burning methods) of obtaining the potassium dititanate may be adopted: a method of subjecting a mixture of a titanium compound and a potassium compound mixed in predetermined proportions to burning processing, a step of adding a predetermined amount of water to the titanium compound and the potassium compound described above and mixing them and subjecting the mixture to burning processing after spray drying processing; and the like. Alternatively, a step (melting method) of obtaining the potassium dititanate by subjecting the mixture of a titanium compound and a potassium compound mixed in predetermined proportions to melting processing and solidifying processing may be adopted.

The following two methods will be separately described in detail below: a first manufacturing method of synthesizing the titanium oxide compound from the potassium dititanate (burning method 2T) obtained by the burning method through the potassium tetratitanate and the hydrated tetratitanate compound; and a second manufacturing method of synthesizing the titanium oxide compound from the potassium dititanate (melting method 2T) obtained by the melting method through the potassium tetratitanate and the hydrated tetratitanate compound.

(First Manufacturing Method)

Figure 1:
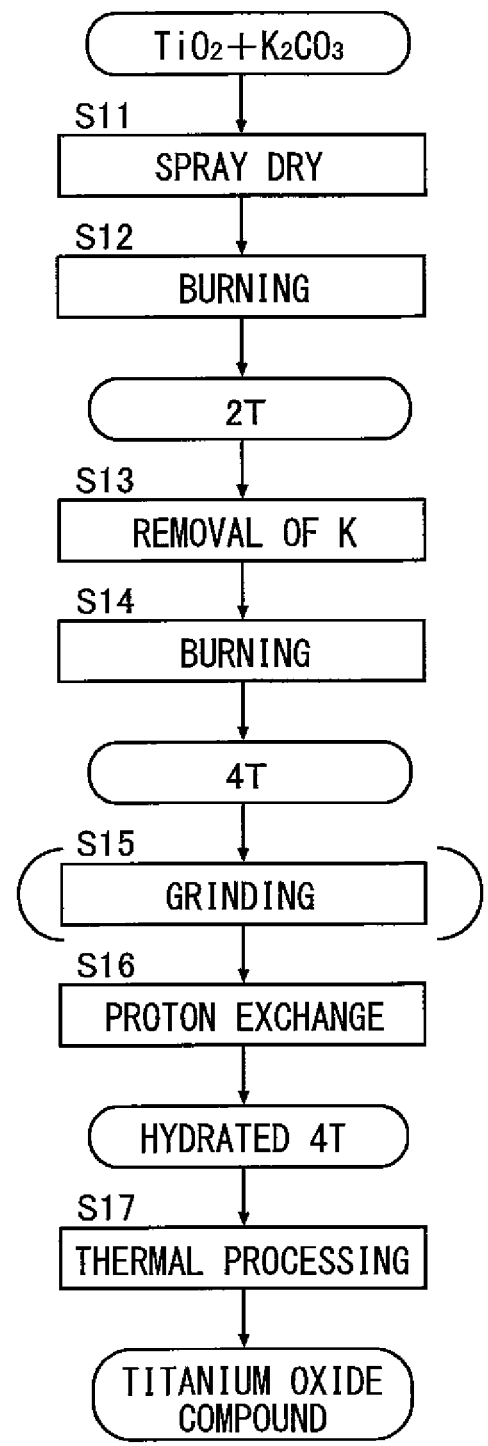
FIG. 1 A flowchart showing an example of a step of manufacturing a titanium oxide compound with a burning method 2T.

FIG. 1 is a flowchart showing an example of a general step of manufacturing the titanium oxide compound with the burning method 2T. In the first manufacturing method, a mixture solution of a titanium dioxide ($TiO_2$) and a potassium carbonate ($K_2CO_3$) mixed in predetermined proportions is first subjected to spray drying processing (step S11) and burning processing (step S12), and thus potassium dititanate ($K_2Ti_2O_5$; the burning method 2T) is synthesized. The potassium dititanate described above has, as shown in FIG. 4, a layer structure where $TiO_5$ trigonal bipyramidals chain-linked are stacked in layers; a space that carries potassium ions is formed between the layers.

Then, the potassium dititanate described above is subjected to potassium removal processing (step S13) and burning processing (step S14), the structure of the $TiO_5$ trigonal bipyramidals is changed into the structure of $TiO_6$ octahedrons and thus the potassium tetratitanate ($K_2Ti_4O_9$; burning method 4T) is synthesized. In other words, this potassium tetratitanate is obtained by eluting part of potassium ions of potassium dititanate expressed by a general formula $K_2Ti_2O_5$, changing the composition and then subjecting it to the burning processing. The potassium tetratitanate described above has, as shown in FIG. 4, a layer structure where the $TiO_6$ octahedrons chain-linked are stacked in layers; a space that carries potassium ions is formed between the layers.

Furthermore, the potassium tetratitanate described above is subjected to grinding processing (the grinding processing may be omitted) (step S15) and proton exchange processing (step S16), and thus the hydrated tetratitanate compound ($H_2Ti_4O_9 \cdot nH_2O$) is synthesized. Then, the hydrated tetratitanate compound is subjected to thermal processing (step S17) at temperatures of 200° C. to 1000° C. (more preferably, 300° C. to 550° C.) for a time period of 0.5 hour to 5 hours, and thus the titanium oxide compound is synthesized.

(Second Manufacturing Method)

Figure 2:
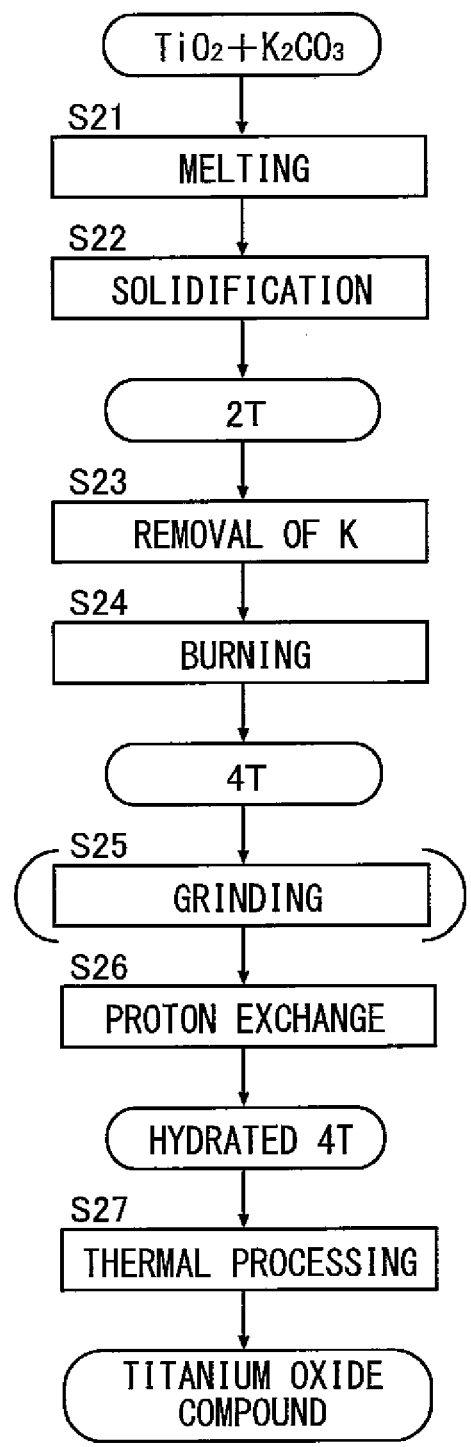
FIG. 2 A flowchart showing an example of a step of manufacturing a titanium oxide compound with a melting method 2T.

FIG. 2 is a flowchart showing an example of a general step of manufacturing the titanium oxide compound with the melting method 2T. In the second manufacturing method, a mixture of a titanium dioxide ($TiO_2$) and a potassium carbonate ($K_2CO_3$) mixed in predetermined proportions is first subjected to melting processing (step S21) and solidifying processing (step S22), and thus potassium dititanate ($K_2Ti_2O_5$; the melting method 2T) is synthesized. The potassium dititanate described above has, as shown in FIG. 4, a layer structure where $TiO_5$ trigonal bipyramidals chain-linked are stacked in layers; a space that carries potassium ions is formed between the layers.

Then, the potassium dititanate described above is subjected to potassium removal processing (step S23) and burning processing (step S24), the structure of the $TiO_5$ trigonal bipyramidals is changed into the structure of $TiO_6$ octahedrons and thus the potassium tetratitanate ($K_2Ti_4O_9$; melting method 4T) is synthesized. In other words, this potassium tetratitanate is obtained by eluting part of potassium ions of potassium dititanate expressed by a general formula $K_2Ti_2O_5$, changing the composition and then subjecting it to the burning processing. The potassium tetratitanate described above has, as shown in FIG. 4, the layer structure where the $TiO_6$ octahedrons chain-linked are stacked in layers; the space that carries potassium ions is formed between the layers.

Furthermore, the potassium tetratitanate described above is subjected to grinding processing (the grinding processing may be omitted) (step S25) and proton exchange processing (step S26), and thus the hydrated tetratitanate compound ($H_2Ti_4O_9 \cdot nH_2O$) is synthesized. Then, the hydrated tetratitanate compound is subjected to thermal processing (step S27) at temperatures of 200° C. to 1000° C. (more preferably, 300° C. to 550° C.), and thus the titanium oxide compound is synthesized.

The titanium oxide compounds obtained by the first manufacturing method and the second manufacturing method have a structure formed by the chain-linked $TiO_6$ octahedrons affected by the basic crystal structure of the potassium tetratitanate, which is an intermediate.

The method of manufacturing the potassium dititanate ($K_2Ti_2O_5$) described in the first manufacturing method and the second manufacturing method is simply an example; the present invention is not limited to this method.

(Conventional Manufacturing Method)

On the other hand, in a conventional method of manufacturing the titanium oxide compound, an alkali titanate compound (for example, sodium trititanate or potassium tetratitanate) that is directly synthesized from a mixture of a titanium compound and a potassium compound mixed in predetermined proportions and that has a layer structure where $TiO_6$ octahedrons chain-linked are stacked in layers is used, and thus the titanium oxide compound is synthesized.

Figure 3:
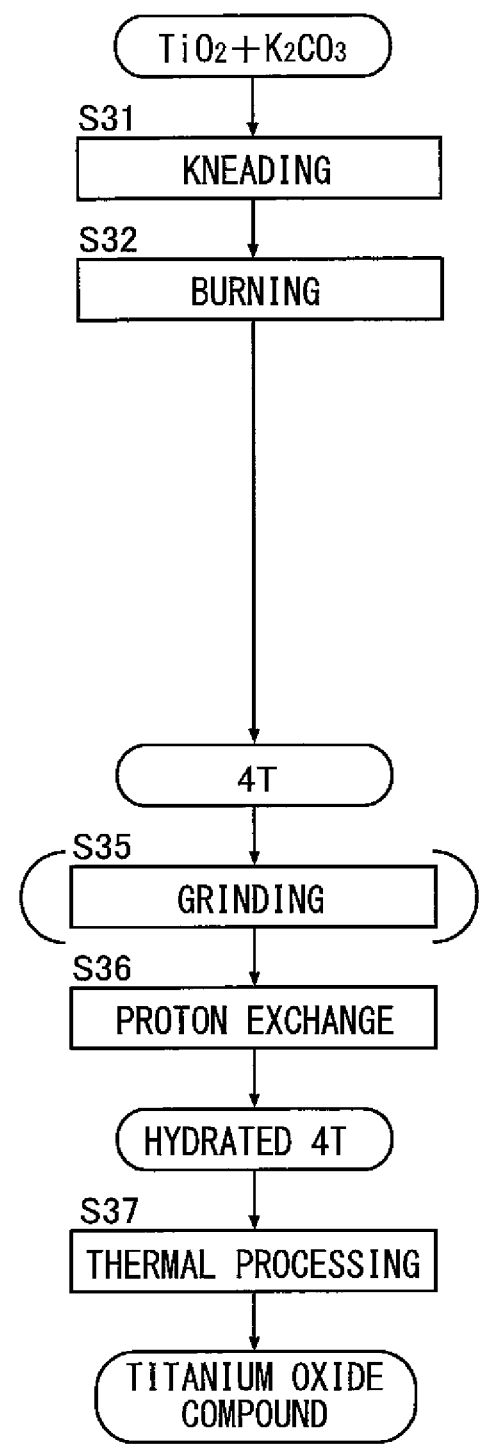
FIG. 3 A flowchart showing an example of a step of manufacturing a titanium oxide compound with a direct synthesis method 4T.

FIG. 3 is a flowchart showing an example of a general step of manufacturing the titanium oxide compound from directly synthesized potassium tetratitanate (direct synthesis method 4T). In the conventional manufacturing method, a mixture of a titanium dioxide ($TiO_2$) and a potassium carbonate ($K_2CO_3$) mixed in predetermined proportions is first subjected to kneading processing (step S31) and burning processing (step S32), and thus potassium tetratitanate ($K_2Ti_4O_9$; the direct synthesis method 4T) is directly synthesized without intervention of potassium dititanate.

Then, the potassium tetratitanate described above is subjected to grinding processing (the grinding processing may be omitted) (step S35) and proton exchange processing (step S36), and thus the hydrated tetratitanate compound ($H_2Ti_4O_9 \cdot nH_2O$) is synthesized. Then, the hydrated tetratitanate compound is subjected to thermal processing (step S37) at temperatures of 200° C. to 1000° C., and thus the titanium oxide compound is synthesized.

As described above, the largest difference between the manufacturing methods (see FIGS. 1 and 2) of the present invention and the conventional manufacturing method (see FIG. 3) lies in whether the step of manufacturing the titanium oxide compound includes the step of obtaining the potassium tetratitanate from the potassium dititanate (regardless of the burning method 2T or the melting method 2T). This difference causes a difference in the crystal structure (and therefore the crystal structure of the titanium oxide compound, which is the final product) of the potassium tetratitanate included in the step of manufacturing the titanium oxide compound.

<Difference in the Structure of the Potassium Tetratitanate>

Figure 5:
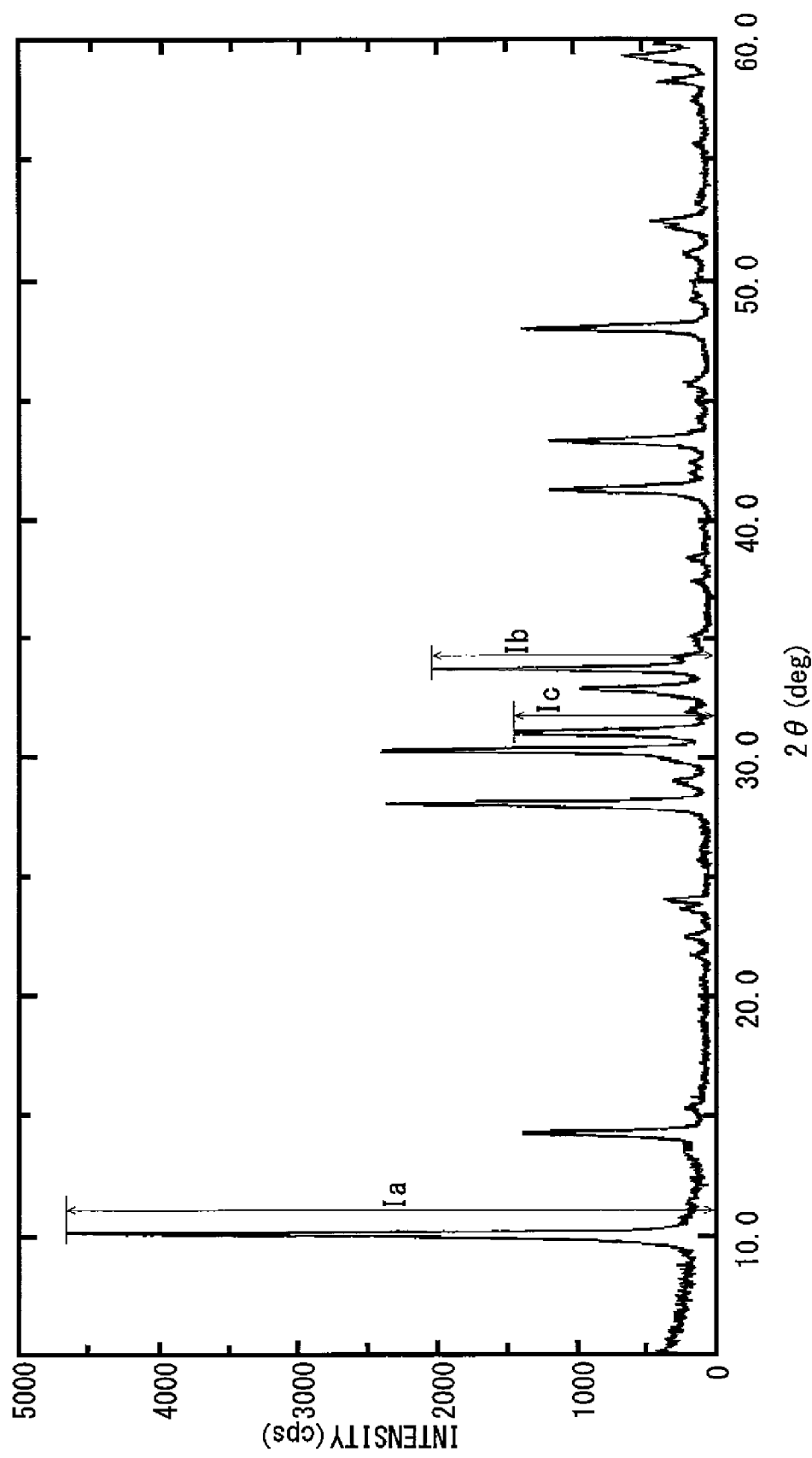
FIG. 5 An X-ray diffraction spectrum diagram of a burning method 4T.
Figure 6:
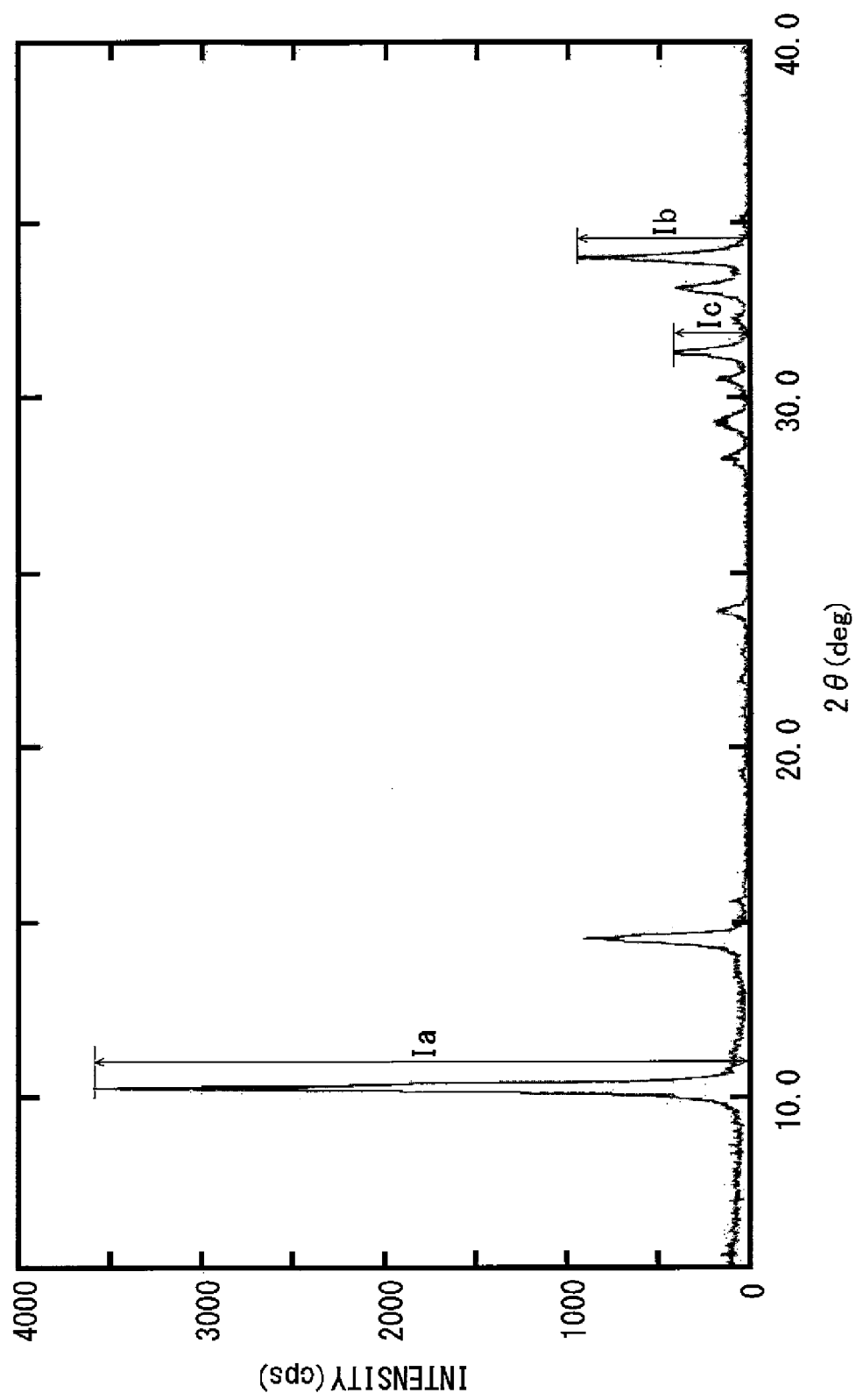
FIG. 6 An X-ray diffraction spectrum diagram of a melting method 4T.
Figure 7:
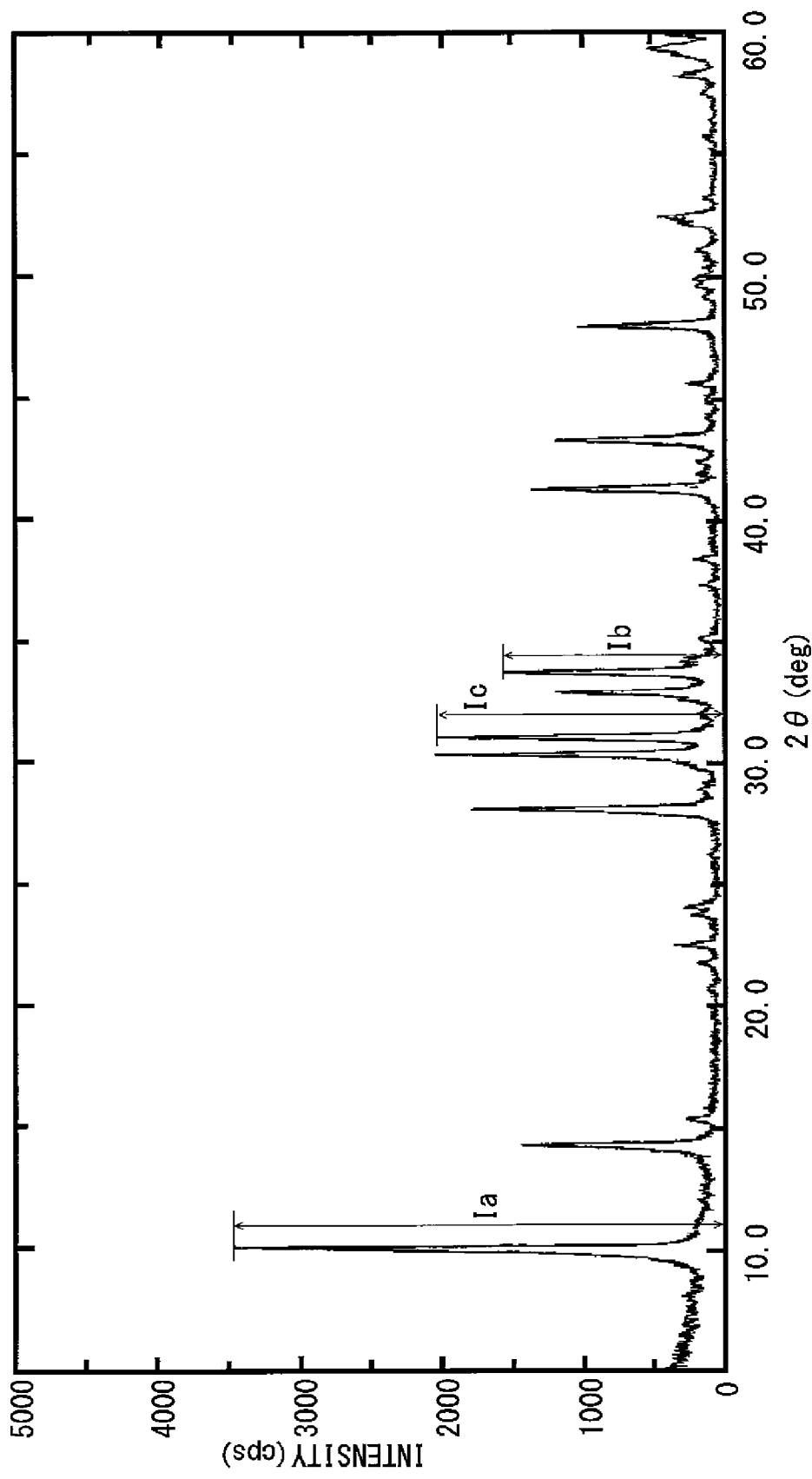
FIG. 7 An X-ray diffraction spectrum diagram of the direct synthesis method 4T.

FIGS. 5 to 7 are X-ray diffraction spectrum diagrams (X-ray source: Cu—Kα) of the burning method 4T, the melting method 4T and the direct synthesis method 4T, respectively.

(1) In the potassium tetratitanate produced by any of the manufacturing methods, an X-ray diffraction peak indicating a (200) plane appears around 2θ=10.08°. The peak intensity Ia of the (200) plane indicates a crystal growth in a direction (an a-axis direction) in which the layer surfaces holing the alkali metal ions are stacked. Hence, in order to increase the number of alkali metal ions held, it is probably preferable to increase the peak intensity Ia.

(2) In the potassium tetratitanate produced by any of the manufacturing methods, an X-ray diffraction peak indicating a (004) plane appears around 2θ=31.0°. The peak intensity Ic of the (004) plane indicates a crystal growth in a c-axis direction; as the peak intensity Ic is increased, the width of the layer surface holing the alkali metal ions is increased (the size of the crystal in the c-axis direction is expressed as the width). Hence, in order to increase the number of alkali metal ions held, it is necessary to somewhat increase the peak intensity Ic; however, when the peak intensity Ic is increased excessively, a movement distance required for the insertion and removal of the alkali metal ions is increased, and thus the ease of the movement of the alkali metal ions is probably degraded.

(3) In the potassium tetratitanate produced by any of the manufacturing methods, an X-ray diffraction peak indicating a (31-3) plane (h=3, k=1, l=−3) appears around $2\theta=33.7°$. The (31-3) plane intersects each of the a-axis, a b-axis and the c-axis; its peak intensity Ib depends on a crystal growth in a b-axis direction more than the crystal growth in the a-axis direction and the crystal growth in the c-axis direction. As the peak intensity Ib is increased, the length of the layer surface holing the alkali metal ions is increased (the size of the crystal in the b-axis direction is expressed as the length). Hence, in order to increase the number of alkali metal ions held, it is necessary to somewhat increase the peak intensity Ib; however, when the peak intensity Ib is increased excessively, the movement distance required for the insertion and removal of the alkali metal ions is increased, and thus the ease of the movement of the alkali metal ions is probably degraded.

Here, consider a structure for achieving a large number of alkali metal ions held and further enhancing the insertion and removal thereof. As a first condition, in order to achieve a large number of alkali metal ions held, it is probably necessary to sufficiently form a layer structure that can hold the alkali metal ions. Moreover, since, in order to enhance the insertion and removal thereof, it is probably preferable that the width/length of the layer surface be lower than the thickness of the layer (the size of the crystal in the a-axis direction is expressed as the thickness), it is probably preferable to satisfy a relationship of Ia>Ic, Ia>Ib.

As a second condition, in order to further enhance the insertion and removal thereof, it is probably preferable that the peak intensity Ic indicating the crystal growth in the c-axis direction be lower than the peak intensity Ib highly depending on the crystal growth in the b-axis direction. In other words, it is probably preferable to satisfy a relationship of Ib>Ic.

In the c-axis direction, since the crystal is grown while a displacement of one side of the $TiO_6$ octahedron is being produced every four $TiO_6$ octahedrons chain-linked, a planar layer structure is not formed. On the other hand, in the b-axis direction, since a planar layer structure is formed, the ease of the movement of the alkali metal ions in the c-axis direction is probably lower than in the b-axis direction. Hence, in order to enhance the ease of the movement of the alkali metal ions, it is probably effective to reduce the crystal growth in the c-axis direction and the width.

When the width of the layer surface holding the alkali metal ions is decreased excessively, its structure is formed such that the number of alkali metal ions held is insufficient (unstable) whereas, when the width is increased excessively, the movement distance of the alkali metal ions is increased. Hence, as a third condition, it is probably preferable to satisfy a relationship of 10.0>Ia/Ic>2.0 (more preferably, a relationship of 5.0>Ia/Ic>2.0)

FIG. 8 is a table showing the intensity ratio of the X-ray diffraction peaks obtained by the potassium tetratitanate of the manufacturing methods. FIG. 8 shows, in the burning method 4T, the melting method 4T and the direct synthesis method 4T, the peak intensities Ic and Ib when the peak intensity Ia is assumed to be 100 and the ratio (Ia/Ic) of the peak intensity Ia to the peak intensity Ic. For the burning method 4T, the results obtained by performing the measurement three times are shown.

As shown in FIG. 8, although the burning method 4T and the melting method 4T satisfy all the first to third conditions described above, the direct synthesis method 4T does not satisfy the second and third conditions described above. Here, as described previously, the titanium oxide compound, which is the final product, has the crystal structure formed by the chain-linked $TiO_6$ octahedrons affected by the basic crystal structure of the potassium tetratitanate, which is an intermediate. It is estimated that, when, in the titanium oxide compound manufactured with the burning method 4T and the melting method 4T, the crystal structure is changed by thermal processing from the basic crystal structure of the potassium tetratitanate, by being affected by the crystal structure of the potassium tetratitanate having the features described above, the crystal structure is formed into a crystal structure suitable for the insertion and removal of lithium ions, that is, a crystal structure having a large number of lithium ions held and a high degree of ease of the movement. Hence, in the titanium oxide compound manufactured with the burning method 4T and the melting method 4T, as compared with the titanium oxide compound manufactured with the direct synthesis method 4T, it is probably possible to increase the number of lithium ions held and the ease of the movement, with the result that it is probably possible to increase the capacity of a lithium-ion secondary battery using this as the negative electrode.

<Application to a Lithium-Ion Secondary Battery>

Figure 9:
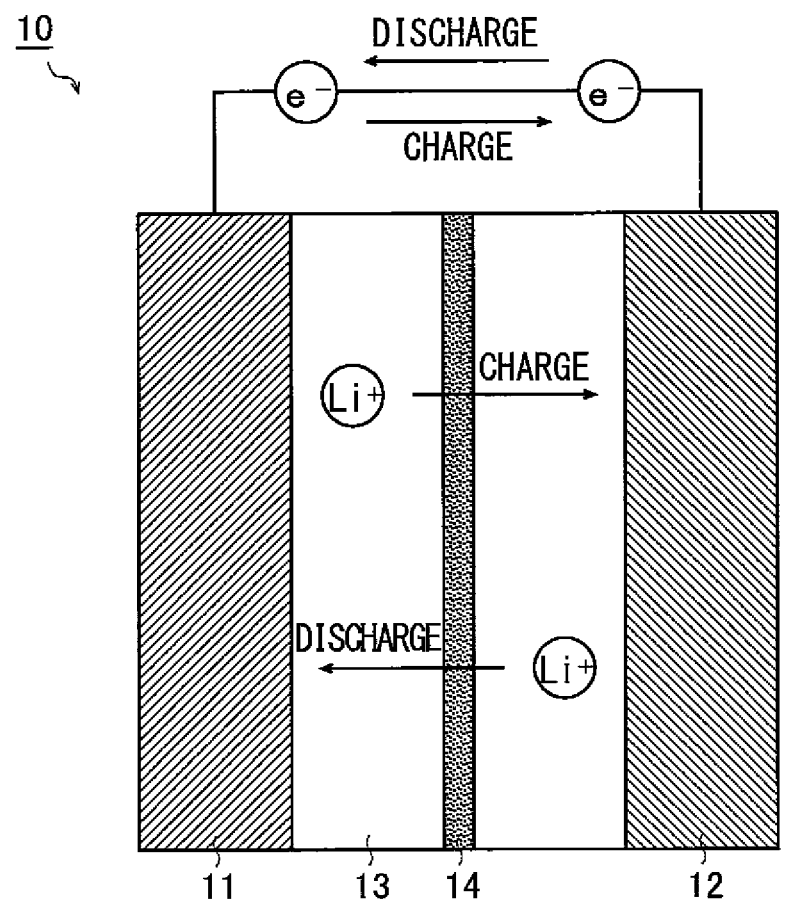
FIG. 9 A schematic diagram showing a schematic configuration of a lithium-ion secondary battery.

FIG. 9 is a schematic diagram showing a schematic configuration of a lithium-ion secondary battery. The lithium-ion secondary battery 10 having the present configuration as an example includes a positive electrode 11, a negative electrode 12, a non-aqueous electrolyte 13 and a separator 14.

The positive electrode 11 has, for example, a structure in which a positive electrode mixture layer is provided on one side or both sides of a positive electrode power collection member. The positive electrode mixture layer includes, for example, as a positive-electrode active substance, a positive electrode material that can absorb and remove lithium, and is formed, as necessary, along with a conductive agent such as a carbon black or a graphite and an adhesion agent such as a polyvinylidene fluoride.

The negative electrode 12 has, for example, a structure in which a negative electrode mixture layer is provided on one side or both sides of a negative electrode power collection member. The negative electrode mixture layer may include, in addition to the negative electrode material (that is, the titanium oxide compound described above) according to the present embodiment, another negative-electrode active substance, a conductive agent or the like.

As the non-aqueous electrolyte 13, a liquid non-aqueous electrolyte prepared by dissolving an electrolyte (lithium salt) in an organic solvent, a gel non-aqueous electrolyte obtained by combining a liquid electrolyte and a polymer material or the like can be used. Examples of the electrolyte include, for example, $LiClO_4$, $LiPF_6$ and $LiBF_4$; any of these compounds or a mixture of two or more of these compounds can be used. Examples of the organic solvent include, for example, a propylene carbonate, an ethylene carbonate, a diethyl carbonate, a dimethyl carbonate and 1,2-dimethoxyethane; any of these compounds or a mixture of two or more of these compounds can be used.

The separator 14 passes lithium ions while separating the positive electrode 11 and the negative electrode 12 to prevent a short-circuit of current caused by contact of both electrodes. The separator 14 is formed with a synthetic resin porous film made of, for example, polytetrafluoroethylene, polypropylene, or polyethylene or a porous film made of an inorganic material such as a ceramic nonwoven fabric; the separator 14 may have a structure where two or more of these porous films are stacked.

As described above, as the negative electrode 12 of the lithium-ion secondary battery 10, instead of a carbon-based raw material, the negative electrode material (the above-described titanium oxide compound manufactured with the burning method 4T or the melting method 4T) of the present embodiment is used. Thus, it is possible to enhance the safety of the lithium-ion secondary battery 10 due to three mechanisms to be described below.

Firstly, an internal short-circuit caused by the precipitation of dendrite is advantageously unlikely to be produced. In the case of a carbon negative electrode, the potential of the negative electrode is low, and thus a dendrite precipitation reaction ($Li^+ + e^- \rightarrow Li$) easily occurs. On the other hand, in the case of a titanium oxide compound negative electrode, the potential of the negative electrode is high, and thus a dendrite precipitation potential is not reached.

Secondly, it is advantageously possible to reduce heat generated when an internal short-circuit occurs. The titanium oxide compound is changed to be insulated with lithium ions fully discharged. Hence, the surface of a portion of the titanium oxide compound where a short-circuit occurs becomes insulated, and thus the progress of the discharge reaction is reduced. In other words, although, in a general lithium-ion secondary battery using a carbon negative electrode, a rapid discharge (heat generation) is produced when a short-circuit occurs, in the lithium-ion secondary battery using the titanium oxide compound negative electrode, the discharge progresses slowly, and thus the temperature is not increased.

Thirdly, the thermal stability is advantageously increased. It is extremely unlikely that, in a titanium oxide compound, a thermal runaway is triggered by reaction with an electrolyte. Unlike carbon, a titanium oxide compound does not burn, and thus it is extremely unlikely that a thermal runaway causes a fire.

Furthermore, the negative electrode material (the above-described titanium oxide compound manufactured with the burning method 4T or the melting method 4T) of the present embodiment is used, and thus it is possible to increase the capacity of the lithium-ion secondary battery 10 as compared with an S-LTO or a titanium oxide compound obtained by the conventional manufacturing method.

Although examples of the present invention will be described below in further detail, the present invention is not limited to these examples. Needless to say, portions, such as various types of processing methods and grinding methods to be described below, to which known general techniques can be applied are not limited to the following examples, and the details thereof can be changed as necessary.

Examples

Example 1

Synthesis with the Burning Method 2T (1-1) Method of Synthesizing Potassium Dititanate (2T)

26.2 weight parts of titanium oxide ($TiO_2$) was mixed and agitated with respect to 100 weight parts of water. Thereafter, 23.8 weight parts of potassium carbonate ($K_2CO_3$) was added and further agitated. The mixed solution was spray dried at 200° C., and was subjected to thermal processing at 800° C. for three hours, and thus potassium dititanate ($K_2Ti_2O_5$) was synthesized.

(1-2) Method of Synthesizing Potassium Tetratitanate (4T)

The potassium dititanate obtained by (1-1) was immersed in water and was then agitated with an agitator, and thus potassium was removed, and, after dehydration and drying, thermal processing was performed at 850° C. for two hours, and thus potassium tetratitanate ($K_2Ti_4O_9$) was synthesized. The X-ray diffraction spectrum of the compound is as shown in FIG. 5 described previously; the relationship between the peak intensities Ia, Ib and Ic is as shown in D1 of FIG. 8. The concentration of potassium of the compound was 19.3 mass percent as a result of composition analysis using fluorescence X-ray.

(1-3) Method of Synthesizing a Hydrated Tetratitanate Compound (Hydrated 4T)

The potassium tetratitanate obtained by (1-2) was ground with a ball mill for 0.5 hour, and then the ground product was put in a 0.5 M sulfuric acid solution and agitated, with the result that potassium was removed. A supernatant thereof was removed, and then dehydration was performed, and thus a hydrated tetratitanate compound ($H_2Ti_4O_9 \cdot nH_2O$) was synthesized. The concentration of potassium of the compound was 1.23 mass percent as a result of composition analysis using fluorescence X-ray.

(1-4) Method of Synthesizing a Titanium Oxide Compound

The hydrated tetratitanate compound obtained by (1-3) was subjected to thermal processing at 350° C., and thus a titanium oxide compound was synthesized. The concentration of potassium of the compound was 1.15 mass percent as a result of composition analysis using fluorescence X-ray; the BET specific surface area thereof was 18.6 $m^2/g$. The X-ray diffraction spectrum (X-ray source: Cu—Kα) of the compound showed a bronze-type titanium oxide having a tunnel structure.

Example 2

Synthesis with the Burning Method 2T (2-1) Method of Synthesizing Potassium Dititanate (2T)

Potassium dititanate was synthesized in the same step as in (1-1).

(2-2) Method of Synthesizing Potassium Tetratitanate (4T)

The potassium dititanate obtained by (2-1) was immersed in water and was then agitated with an agitator after the addition of an acid, and thus potassium was removed. A supernatant thereof was removed, and then, after dehydration and drying, thermal processing was performed at 850° C. for two hours, and thus potassium tetratitanate was synthesized. The relationship between the X-ray diffraction peak intensities Ia, Ib and Ic of the compound is as shown in D2 of FIG. 8. The concentration of potassium of the compound was 19.2 mass percent as a result of composition analysis using fluorescence X-ray.

(2-3) Method of Synthesizing a Hydrated Tetratitanate Compound (Hydrated 4T)

A hydrated tetratitanate compound was synthesized in the same step as in (1-3) except that the potassium tetratitanate obtained by (2-2) was used. The concentration of potassium of the compound was 1.30 mass percent as a result of composition analysis using fluorescence X-ray.

(2-4) Method of Synthesizing a Titanium Oxide Compound

A titanium oxide compound was synthesized in the same step as in (1-4) except that the hydrated tetratitanate compound obtained by (2-3) was used. The concentration of potassium of the compound was 1.23 mass percent as a result of composition analysis using fluorescence X-ray; the BET specific surface area thereof was 19.0 m²/g. The X-ray diffraction spectrum (X-ray source: Cu—Kα) of the compound showed a bronze-type titanium oxide having a tunnel structure.

Example 3

Synthesis with the Burning Method 2T (3-1) Method of Synthesizing Potassium Dititanate (2T)
Potassium dititanate was synthesized in the same step as in (1-1).

(3-2) Method of Synthesizing Potassium Tetratitanate (4T)
Potassium tetratitanate was synthesized in the same step as in (1-2).

(3-3) Method of Synthesizing a Hydrated Tetratitanate Compound (Hydrated 4T)

A hydrated tetratitanate compound was synthesized in the same step as in (1-3) except that the potassium tetratitanate obtained by (3-2) was used and that the concentration of the sulfuric acid solution is changed to 1.0 M. The concentration of potassium of the compound was 0.15 mass percent as a result of composition analysis using fluorescence X-ray.

(3-4) Method of Synthesizing a Titanium Oxide Compound

A titanium oxide compound was synthesized in the same step as in (1-4) except that the hydrated tetratitanate compound obtained by (3-3) was used. The concentration of potassium of the compound was 0.08 mass percent as a result of composition analysis using fluorescence X-ray; the BET specific surface area thereof was 19.6 m²/g. The X-ray diffraction spectrum (X-ray source: Cu—Kα) of the compound showed a bronze-type titanium oxide having a tunnel structure.

Example 4

Synthesis with the Burning Method 2T (4-1) Method of Synthesizing Potassium Dititanate (2T)
Potassium dititanate was synthesized in the same step as in (1-1).

(4-2) Method of Synthesizing Potassium Tetratitanate (4T)
Potassium tetratitanate was synthesized in the same step as in (1-2).

(4-3) Method of Synthesizing a Hydrated Tetratitanate Compound (Hydrated 4T)

A hydrated tetratitanate compound was synthesized in the same step as in (1-3) except that the potassium tetratitanate obtained by (4-2) was used and that the concentration of the sulfuric acid solution is changed to 0.05 M. The concentration of potassium of the compound was 1.88 mass percent as a result of composition analysis using fluorescence X-ray.

(4-4) Method of Synthesizing a Titanium Oxide Compound

A titanium oxide compound was synthesized in the same step as in (1-4) except that the hydrated tetratitanate compound obtained by (4-3) was used. The concentration of potassium of the compound was 1.78 mass percent as a result of composition analysis using fluorescence X-ray; the BET specific surface area thereof was 17.9 m²/g. The X-ray diffraction spectrum (X-ray source: Cu—Kα) of the compound showed a bronze-type titanium oxide having a tunnel structure.

Example 5

Synthesis with the Burning Method 2T (5-1) Method of Synthesizing Potassium Dititanate (2T)
Potassium dititanate was synthesized in the same step as in (1-1).

(5-2) Method of Synthesizing Potassium Tetratitanate (4T)
Potassium tetratitanate was synthesized in the same step as in (2-2).

(5-3) Method of Synthesizing a Hydrated Tetratitanate Compound (Hydrated 4T)

A hydrated tetratitanate compound was synthesized in the same step as in (1-3) except that the potassium tetratitanate obtained by (5-2) was used and that the grinding time was extended to 2.5 hours. The concentration of potassium of the compound was 0.52 mass percent as a result of composition analysis using fluorescence X-ray.

(5-4) Method of Synthesizing a Titanium Oxide Compound

A titanium oxide compound was synthesized in the same step as in (1-4) except that the hydrated tetratitanate compound obtained by (5-3) was used. The concentration of potassium of the compound was 0.44 mass percent as a result of composition analysis using fluorescence X-ray; the BET specific surface area thereof was 38.4 m²/g. The X-ray diffraction spectrum (X-ray source: Cu—Kα) of the compound showed a bronze-type titanium oxide having a tunnel structure.

Example 6

Synthesis with the Burning Method 2T (6-1) Method of Synthesizing Potassium Dititanate (2T)
Potassium dititanate was synthesized in the same step as in (1-1).

(6-2) Method of Synthesizing Potassium Tetratitanate (4T)
Potassium tetratitanate was synthesized in the same step as in (2-2).

(6-3) Method of Synthesizing a Hydrated Tetratitanate Compound (Hydrated 4T)

A hydrated tetratitanate compound was synthesized in the same step as in (1-3) except that the potassium tetratitanate obtained by (6-2) was used and that the grinding processing was not performed. The concentration of potassium of the compound was 1.62 mass percent as a result of composition analysis using fluorescence X-ray.

(6-4) Method of Synthesizing a Titanium Oxide Compound

A titanium oxide compound was synthesized in the same step as in (1-4) except that the hydrated tetratitanate compound obtained by (6-3) was used. The concentration of potassium of the compound was 1.54 mass percent as a result of composition analysis using fluorescence X-ray; the BET specific surface area thereof was 12.1 m²/g. The X-ray diffraction spectrum (X-ray source: Cu—Kα) of the compound showed a bronze-type titanium oxide having a tunnel structure.

Example 7

Synthesis with the Melting Method 2T (7-1) Method of Synthesizing Potassium Dititanate (2T)

Potassium carbonate ($K_2CO_3$) and titanium dioxide ($TiO_2$) were mixed such that the mole ratio of $K_2O$ to $TiO_2$ was 1 to 2, were dissolved at 1100° C. and were then cooled, with the result that potassium dititanate was synthesized.

(7-2) Method of Synthesizing Potassium Tetratitanate (4T)

The potassium dititanate obtained by (7-1) was immersed in water and was agitated with an agitator, and thus potassium was removed, and, after dehydration and drying, thermal processing was performed at 850° C. for two hours, and thus potassium tetratitanate was synthesized. The X-ray diffraction spectrum of the compound is as shown in FIG. 6 described previously; the relationship between the peak intensities Ia, Ib and Ic is as shown in D4 of FIG. 8. The concentration of potassium of the compound was 18.9 mass percent as a result of composition analysis using fluorescence X-ray.

(7-3) Method of Synthesizing a Hydrated Tetratitanate Compound (Hydrated 4T)

A hydrated tetratitanate compound was synthesized in the same step as in (1-3) except that the potassium tetratitanate obtained by (7-2) was used and that the grinding processing was not performed. The concentration of potassium of the compound was 1.54 mass percent as a result of composition analysis using fluorescence X-ray.

(7-4) Method of Synthesizing a Titanium Oxide Compound

A titanium oxide compound was synthesized in the same step as in (1-4) except that the hydrated tetratitanate compound obtained by (7-3) was used. The concentration of potassium of the compound was 1.48 mass percent as a result of composition analysis using fluorescence X-ray; the BET specific surface area thereof was 14.3 $m^2/g$. The X-ray diffraction spectrum (X-ray source: Cu—Kα) of the compound showed a bronze-type titanium oxide having a tunnel structure.

Comparative Example 1

Synthesis with the Direct Synthesis Method 4T (8-1) Method of Synthesizing Potassium Tetratitanate (4T)

Potassium carbonate ($K_2CO_3$) and titanium dioxide ($TiO_2$) were mixed with a mortar such that the mole ratio of $K_2O$ to $TiO_2$ was 1 to 4. Then, water was added such that the mixture was changed into the state of clay, and the mixture was further mixed. After drying, thermal processing was performed at 950° C. for two hours, and thus potassium tetratitanate was synthesized. The X-ray diffraction spectrum of the compound is as shown in FIG. 7 described previously; the relationship between the peak intensities Ia, Ib and Ic is as shown in D5 of FIG. 8. The concentration of potassium of the compound was 19.6 mass percent as a result of composition analysis using fluorescence X-ray.

(8-2) Method of Synthesizing a Hydrated Tetratitanate Compound (Hydrated 4T)

A hydrated tetratitanate compound was synthesized in the same step as in (1-3) except that the potassium tetratitanate obtained by (8-1) was used. The concentration of potassium of the compound was 1.16 mass percent as a result of composition analysis using fluorescence X-ray.

(8-3) Method of Synthesizing a Titanium Oxide Compound

A titanium oxide compound was synthesized in the same step as in (1-4) except that the hydrated tetratitanate compound obtained by (8-2) was used. The concentration of potassium of the compound was 0.98 mass percent as a result of composition analysis using fluorescence X-ray; the BET specific surface area thereof was 22.6 $m^2/g$. The X-ray diffraction spectrum (X-ray source: Cu—Kα) of the compound showed a bronze-type titanium oxide having a tunnel structure.

<Analyzing Devices>

The analyzing devices used in examples 1 to 7 and comparative example 1 described above are as follows.

The X-ray diffraction device: made by Rigaku Corporation, measurement in Ultima 4 with Cu—Kα rays The fluorescence X-ray analyzing device: made by Rigaku Corporation, RIX1000

<Production of Electrodes>

The individual electrodes were produced using, as the active substance, the titanium oxide compound synthesized in examples 1 to 7 and comparative example 1. Specifically, a paint was made by first dissolving 10 weight parts of a polyvinylidene fluoride in N-methyl-2-pyrrolidone, then adding as a conduction auxiliary agent 10 weight parts of a conductive carbon and 80 weight parts of the titanium oxide compound obtained in examples 1 to 7 and comparative example 1 and kneading the compound with a rotation-revolution agitator. The paint was applied onto an aluminum foil, and then the foil was pressed after vacuum dying at 150° C. and was punched out in a circular shape.

<Assembly of a Cell>

Figure 10:
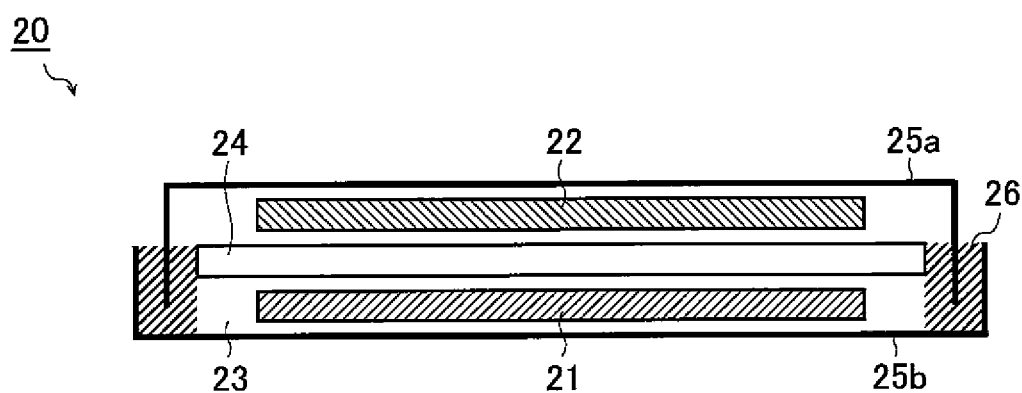
FIG. 10 A schematic diagram of a coin-shaped cell used for battery function evaluation.

The individual electrodes produced as described above were used to assemble a coin-shaped cell 20 shown in FIG. 10. The coin-shaped cell 20 was produced by sandwiching, between an upper case 25a and a lower case 25b, an electrode 21, an opposite electrode 22, a non-aqueous electrolyte 23 and a separator 24 and by sealing the surrounding of the upper case 25a and the lower case 25b with a gasket 26.

As the opposite electrode 22, a metal lithium foil was used. As the non-aqueous electrolyte 23, a non-aqueous electrolyte obtained by dissolving 1 mol/L of $LiPF_6$ in 1:1 v/v % of ethylene carbonate:dimethyl carbonate was used. As the separator 24, a polypropylene porous film was used.

<Method of Evaluating the Battery and its Results>

Here, in the coin-shaped cell described above, since metal lithium was used as the opposite electrode, the potential of each electrode is higher than that of the opposite electrode. Hence, the direction of the insertion and removal of lithium ions caused by charge and discharge is opposite to a direction when each electrode is used as the negative electrode of the lithium-ion secondary battery. However, in the following description, for convenience, the direction in which lithium ions are removed from each electrode is expressed as discharge, and the direction in which lithium ions are inserted into each electrode is expressed as charge.

The coin-shaped cell 20 described above was used to perform charge and discharge at a charge/discharge rate of 0.2 C with reference to metal lithium at room temperature in a potential range of 1.0 to 3.0 volts. FIG. 11 is a table showing the initial discharge capacity in examples 1 to 7 and comparative example 1.

As obvious from comparison of examples 1 to 7 and comparative example 1, in the titanium oxide compound manufactured with the burning method 4T and the melting method 4T, as compared with the titanium oxide compound manufactured with the direct synthesis method 4T, it is possible to increase the discharge capacity by increasing the amount of lithium ions held and the ease of the movement. Hence, it is demonstrated that the use of the titanium oxide compound according to the present invention as the negative-electrode active substance can facilitate the enhancement of the charge/discharge characteristics of the lithium-ion secondary battery provided by using as the positive electrode a lithium-containing composite oxide such as $LiCoO_2$, $LiNiO_2$, $LiMn_2O_4$, $LiFePO_4$ or the like.

<The Amount of Potassium Left>

The concentration of potassium left in the titanium oxide compound is preferably reduced to 2.0 mass percent or less, and more preferably falls within a range of 0.1 to 1.5 mass percent. In general, that potassium is left in the titanium oxide compound means that a replacement place where lithium ions are to be held is occupied by potassium ions, and this probably causes the function of the battery to be degraded. However, since the radius of a potassium ion is larger than that of a lithium ion (the ion radius of Pauling: 133 pm [pm is picometer] in a potassium ion, 60 pm in a lithium ion), it is estimated that the function of retaining the crystal structure of the titanium oxide compound by the presence of a given amount within the crystal structure is achieved, and that thus it is possible to more facilitate the movement of a lithium ion having a small ion radius.

<BET Specific Surface Area>

The specific surface area of the titanium oxide compound measured with the BET method is preferably equal to or more than 3 but equal to or less than 80 $m^2/g$ (more preferably falls within a range of 5 to 20 $m^2/g$). This is probably because, when the specific surface area is excessively large (including a case where the average particle size is excessively small), the activity of the reaction between the titanium oxide compound and the non-aqueous electrolyte is excessively increased, and thus the life of the battery is reduced.

Although the embodiment of the present invention has been described above, the configuration of the present invention is not limited to the embodiment, and various modifications are possible without departing from the spirit of the present invention. In other words, the embodiment described above should be considered to be illustrative in all respects but should not be considered to be restrictive. It should be understood that the technical range of the present invention is indicated by the scope of claims and includes meanings equivalent to the scope of claims and all modifications within the scope.

INDUSTRIAL APPLICABILITY

The titanium oxide compound according to the present invention can be utilized as, for example, the negative electrode of a lithium-ion secondary battery.

REFERENCE SIGNS LIST 10 lithium-ion secondary battery
11 positive electrode
12 negative electrode
13, 23 non-aqueous electrolyte
14, 24 separator
20 coin-shaped cell
21 electrode
22 opposite electrode
25a, 25b upper case, lower case
26 gasket

The invention claimed is:

1. A bronze-type titanium oxide in which potassium tetratitanate expressed by a general formula $K_2Ti_4O_9$ is obtained by converting a mixture of a titanium compound and a potassium compound into potassium dititanate expressed by a general formula $K_2Ti_2O_5$ by burning processing, then eluting a part of potassium ions of the potassium dititanate to change a composition thereof and thereafter performing thermal processing, and which is obtained by eluting potassium of the obtained potassium tetratitanate and performing thermal processing,
wherein, in an X-ray diffraction spectrum of the potassium tetratitanate obtained by using a Cu—Kα ray source, between a peak intensity Ia of a (200) plane, a peak intensity Ic of a (004) plane and a peak intensity Ib of a (31-3) plane, a relationship of Ia>Ib>Ic and a relationship of 5.0>Ia/Ic>2.0 are satisfied, and
a concentration of potassium in the bronze-type titanium oxide is equal to or more than 0.1 mass percent but equal to or less than 2.0 mass percent.

2. The bronze-type titanium oxide of claim 1,
wherein a specific surface area measured with a BET method is equal to or more than 3 but equal to or less than 80 $m^2/g$.

3. A negative electrode,
wherein the bronze-type titanium oxide of claim 1 is used as a negative-electrode active substance.

4. A lithium-ion secondary battery comprising:
the negative electrode of claim 3.

5. A method of manufacturing a bronze-type titanium oxide, the method comprising:
a step of converting a mixture of a titanium compound and a potassium compound into potassium dititanate expressed by a general formula $K_2Ti_2O_5$ by burning processing;
a step of obtaining, by subjecting the potassium dititanate to potassium removal processing and burning processing, potassium tetratitanate in which, in an X-ray diffraction spectrum obtained by using a Cu—Kα ray source, between a peak intensity Ia of a (200) plane, a peak intensity Ic of a (004) plane and a peak intensity Ib of a (31-3) plane, a relationship of Ia>Ib>Ic and a relationship of 5.0>Ia/Ic>2.0 are satisfied;
a step of obtaining a hydrated tetratitanate compound by subjecting the potassium tetratitanate to proton exchange processing; and
a step of obtaining the bronze-type titanium oxide having a concentration of potassium equal to or more than 0.1 mass percent but equal to or less than 2.0 mass percent by subjecting the hydrated tetratitanate compound to thermal processing at temperatures of 300° C. to 550° C.

6. A negative electrode,
wherein the bronze-type titanium oxide obtained by the manufacturing method of claim 5 is used as a negative-electrode active substance.

7. A lithium-ion secondary battery comprising:
the negative electrode of claim 6.

* * * * *